(12) United States Patent
Uejima et al.

(10) Patent No.: US 8,180,414 B2
(45) Date of Patent: May 15, 2012

(54) PORTABLE RADIO DEVICE

(75) Inventors: Hiroyuki Uejima, Sendai (JP); Shingo Sumi, Sendai (JP); Hideki Hayama, Yokohama (JP); Haruhiko Kakitsu, Sendai (JP); Yukari Yamazaki, Sendai (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 12/681,370

(22) PCT Filed: Sep. 30, 2008

(86) PCT No.: PCT/JP2008/002747
§ 371 (c)(1),
(2), (4) Date: Apr. 1, 2010

(87) PCT Pub. No.: WO2009/057247
PCT Pub. Date: May 7, 2009

(65) Prior Publication Data
US 2010/0240424 A1 Sep. 23, 2010

(30) Foreign Application Priority Data

Oct. 31, 2007 (JP) .................................. 2007-283437
Jun. 10, 2008 (JP) .................................. 2008-151977

(51) Int. Cl.
*H04M 1/00* (2006.01)
(52) U.S. Cl. ............... 455/575.3; 455/575.1; 455/575.7; 343/702; 343/893
(58) Field of Classification Search ............... 455/575.1, 455/575.3, 575.7; 343/702, 893
See application file for complete search history.

(56) References Cited

U.S. PATENT DOCUMENTS 7,423,596 B2 * 9/2008 Maniwa et al. ........ 343/700 MS
2008/0143609 A1 * 6/2008 Mashima et al. ............. 343/702

FOREIGN PATENT DOCUMENTS

| JP | 2003-060759 A | 2/2003 |
| JP | 3596774 B1 | 12/2004 |
| JP | 2005-006096 A | 1/2005 |
| JP | 2005-216158 A | 8/2005 |
| JP | 2006-166370 A | 6/2006 |
| JP | 2006-254092 A | 9/2006 |
| JP | 2007-122195 A | 5/2007 |
| WO | 20061057350 A1 | 6/2006 |
| WO | 20071018146 A1 | 2/2007 |
| WO | 20071050666 A1 | 5/2007 |

OTHER PUBLICATIONS

International Search Report, mailed Oct. 28, 2008, issued in corresponding International Application No. PCT/JP2008/002747, filed Sep. 30, 2008.

* cited by examiner

*Primary Examiner* — Tuan H Nguyen
(74) *Attorney, Agent, or Firm* — Seed IP Law Group PLLC

(57) ABSTRACT

There is adopted an enclosure dipole antenna structure including antenna elements respectively provided in a lower enclosure and an upper enclosure. There is also adopted a structure in which the lower structure and the upper structure are rotatably joined together along two axes of hinges. The enclosures thereby become openable and closable in two directions including a vertical direction and a horizontal direction. There can be implemented high antenna performance without use of an external antenna even regardless of whether the enclosures are opened in the vertical direction or the horizontal direction. A feeding section and a connection section are separated from each other by a distance of ⅟₂₀ or more of a wavelength corresponding to an operating frequency. Power can well be fed to the antenna elements.

7 Claims, 8 Drawing Sheets

FIG.10
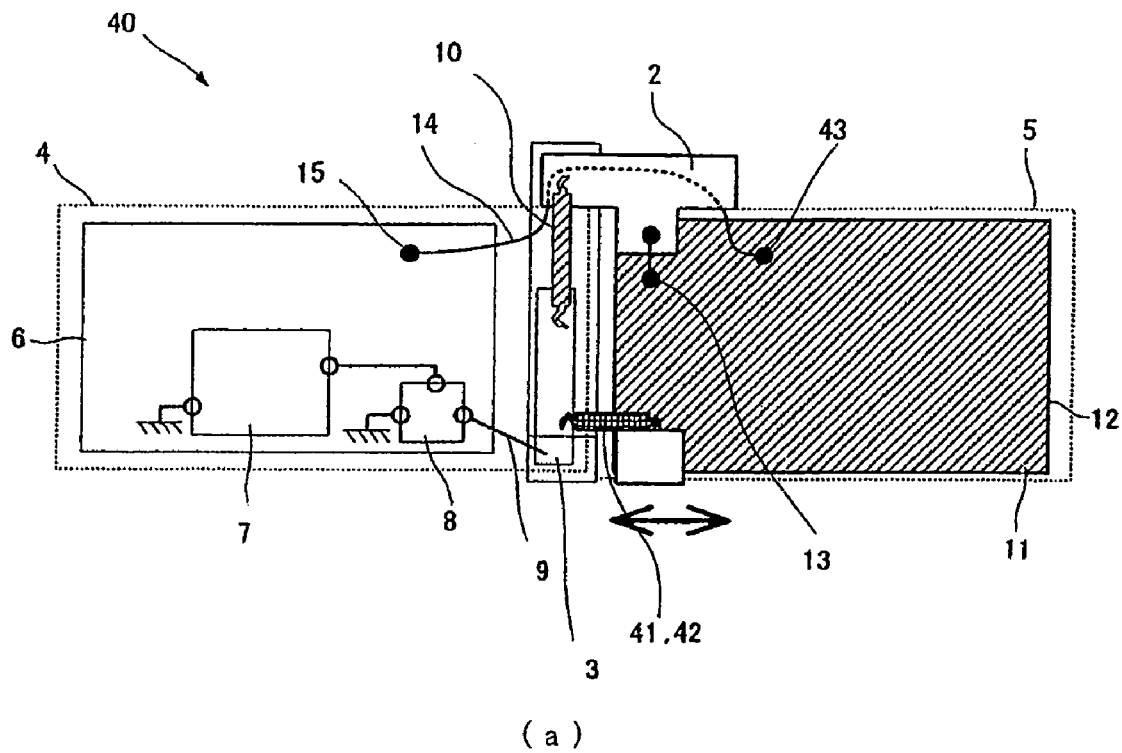
(a)
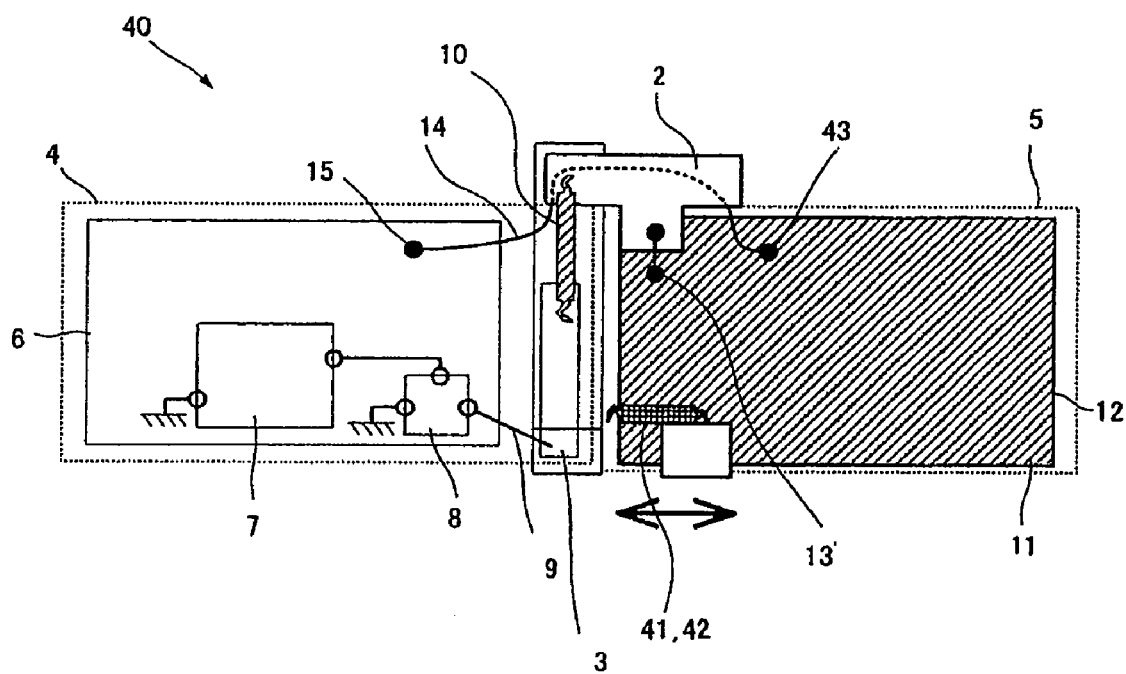
(b)

PORTABLE RADIO DEVICE

TECHNICAL FIELD

The present invention relates to a portable radio device, such as a portable phone and a PHS (Personal Handy-Phone System), and, more particularly, to a portable radio device whose enclosures have a collapsible structure.

BACKGROUND ART

Hitherto, a portable radio device having the foregoing collapsible structure generally has a mechanism for openably and closably joining an upper enclosure to a lower enclosure by means of a hinge section and can assume two states; namely, an open state and a closed state. A portable radio device having such a structure includes; for instance, portable radio devices described in connection with Patent Document 1 and Patent Document 2. The portable radio device described in connection with Patent Document 1 is openable and closable in its longitudinal direction (vertical direction), and the portable radio device (a portable information processing device) described in connection with Patent Document 2 is openable and closable in two directions including a longitudinal direction and a lateral direction (a horizontal direction). The portable radio device described in connection with Patent Document 1 has an enclosure dipole structure including a conductive metal frame provided on an upper enclosure. The portable information processing device described in connection with Patent Document 2 has an external antenna (a so-called whip antenna) structure.

Patent Document 1: JP-A-2005-006096
Patent Document 2: JP-A-2003-060759

DISCLOSURE OF THE INVENTION

Problem that the Invention is to Solve

Since the portable radio device described in connection Patent Document 1 adopts the enclosure dipole antenna structure, high antenna performance can be fulfilled. However, a problem of the portable radio device is that the device opens in only the vertical direction. The portable information processing device described in connection with Patent Document 2 opens in both the vertical direction and the horizontal direction. However, since the portal information processing device adopts an external antenna structure, there is a problem of a low degree of design freedom of the device and difficulty in miniaturization of the device.

The present invention has been conceived in view of the circumstance and an object thereof is to provide a portable radio device that is openable and closable in two directions including the vertical direction and the horizontal direction and that can exhibit high antenna performance without use of an external antenna even when the device is opened in either the vertical direction or the horizontal direction.

Means for Solving the Problem

In order to achieve the object, there is provided a portable radio device comprising: a first enclosure; a second enclosure; a hinge section that rotatably joins the first enclosure to the second enclosure along two axes; a first antenna element; a second antenna element provided in the second enclosure; a circuit board provided in the first enclosure; a feeding section for feeding power from the circuit board to one end of the first antenna element; a cable section for electrically connecting together the first enclosure and the second enclosure; and a connection section for connecting the circuit board to the cable section, wherein the hinge section is formed from a conductive member; the other end of the first antenna element is electrically connected to the hinge section; the second antenna element and the hinge section are electrically connected to each other; and the feeding section and the connection section are separated from each other by a distance of $\frac{1}{20}$ or more of a wavelength corresponding to an operating frequency.

According to the configuration, there is adopted an enclosure dipole antenna structure including antenna elements provided in enclosures. There is also adopted a structure that rotatably joins the first enclosure to the second enclosure along two axes. Therefore, the first enclosure and the second enclosure can open and close in two directions including the vertical direction and the horizontal direction. High antenna performance can be achieved regardless of whether the enclosures are opened in the vertical direction and the horizontal direction. Since there is adopted a structure in which the feeding section and the connection section are separated from each other by a distance of $\frac{1}{20}$ or more of a wavelength corresponding to an operating frequency, high radiation resistance can be assured, and hence high antenna performance can be exhibited. Specifically, the shorter the distance between the feeding section and the connection section becomes, the lower the radiation resistance becomes, so that antenna performance is deteriorated. Occurrence of the problem can be prevented by separating the feeding section apart from the connection section by a distance of $\frac{1}{20}$ or more of the wavelength corresponding to the operating frequency. For instance, when a one-segment broadcast is received, the feeding section and the connection section are separated from each other by a distance of 40 mm or more.

In the above configuration, the portable radio device comprises a switching unit which is adapted to electrically switch the hinge section or the first antenna element and the second antenna element between an electrically connected state and an electrically disconnected state, and the switching unit electrically connects the hinge section or the first antenna element to the second antenna element when the second enclosure is opened in a longitudinal direction with respect to the first enclosure, and the switching unit is separated from the connection section for connecting the circuit board provided in the second enclosure to the cable section by the distance of $\frac{1}{20}$ or more of the wavelength corresponding to the operating frequency.

By means of the configuration, when the second enclosure is longitudinally opened with respect to the first enclosure, the hinge section or the first antenna element and the second antenna element are electrically connected together at a position that is separated from the connection section for connecting the circuit board provided in the second enclosure to the cable section by the distance of $\frac{1}{20}$ or more of the wavelength corresponding to an operating frequency. A current component achieved at the hinge section and the first antenna element and a current component achieved at an end close to the hinge section of the second antenna element, which are out of phase with each other, can be lessened, and high radiation resistance can be assured. Therefore, when the portable radio device is vertically opened, much greater antenna performance can be implemented.

There is also provided a portable radio device comprising: a first enclosure; a second enclosure; a first hinge section that rotatably joins the first enclosure to the second enclosure along one axis; a second hinge section that rotatably joins the first enclosure to the second enclosure along another axis orthogonal to the one axis; a first antenna element; a second antenna element provided in the second enclosure; a circuit board provided in the first enclosure; a feeding section for feeding power from the circuit board to the first hinge section; a cable section for electrically connecting the first enclosure to the second enclosure; and a connection section for connecting the circuit board to the cable section, wherein each of the first hinge section and the second hinge section are formed from a conductive member; the feeding section and the first hinge section are electrically connected together; the second antenna element and the second hinge section are electrically connected together; the first hinge section and the second hinge section are electrically connected together by way of the first antenna element; and the feeding section and the connection section are separated from each other by a distance of 1/20 or more of a wavelength corresponding to an operating frequency.

The configuration enables opening and closing of the first enclosure and the second enclosure in two directions including the vertical direction and the horizontal direction.

In the above configuration, the portable radio device further comprises a switching unit which is adapted to electrically switch the first hinge section or the first antenna element and the second antenna element between an electrically connected state and an electrically disconnected state, and the switching unit electrically connects the first hinge section or the first antenna element to the second antenna element when the second enclosure is opened in a longitudinal direction with respect to the first enclosure; and the switching unit is separated from the connection section for connecting the circuit board provided in the second enclosure to the cable section by the distance of 1/20 or more of the wavelength corresponding to the operating frequency.

By means of the configuration, when the second enclosure is longitudinally opened with respect to the first enclosure, the first hinge section or the first antenna element and the second antenna element are electrically connected together at a position that is separated from the connection section for connecting the circuit board provided in the second enclosure to the cable section by the distance of 1/20 or more of the wavelength corresponding to the operating frequency. A current component achieved at the first hinge section and the first antenna element and a current component achieved at an end close to the hinge section of the second antenna element, which are out of phase with each other, can be lessened, and high radiation resistance can be assured. Therefore, when the portable radio device is vertically opened, much greater antenna performance can be implemented.

In the above configuration, the portable radio device further comprises a reactance element connected in series to the first antenna element.

Since a relationship between a phase of an electric current in the first antenna element and a phase of an electric current in the circuit board can be optimized, much higher antenna performance can be implemented.

In the above configuration, the portable radio device further comprises: a first matching circuit and a second matching circuit, each connected to the feeding section; a detection unit which is adapted to detect a direction in which the second enclosure rotates with respect to the first enclosure; and a switching circuit for switching between the first matching circuit and the second matching circuit according to a result of detection of the detection unit.

According to the configuration, the matching circuits are switched according to an opening direction. Therefore, even when a change arises in impedance as a result of the geometry of the antenna being modified according to an opening direction, the impedance can be optimized. Thus, much higher antenna performance can be realized.

In the above configuration, the second antenna element is a metal frame configuring a part of the second enclosure.

According to the configuration, the metal frame configuring a part of the second enclosure can be used also as the second antenna element, and hence the thickness and cost of portable radio device can be curtailed.

In the above configuration, the second antenna element is a ground pattern of the circuit board provided in the second enclosure.

According to the configuration, the ground pattern of the circuit board provided in the second enclosure can be used also as a second antenna element, and hence thickness and cost of the portable radio device can be curtailed.

In the above configuration, the portable radio device further comprises a lock mechanism that is adapted to lock the second enclosure to open in a lateral direction with respect to the first enclosure; and the switching unit is the lock mechanism.

According to the configuration, the switching unit for switching, between an electrically connected state and an electrically disconnected state, the hinge section, the first hinge section, or the first antenna element and the second antenna element is used also as the lock mechanism, whereby the thickness and cost of portable radio device can be curtailed.

Advantageous Effect of the Invention

According to the present invention, portable radio device having a structure that enables folding of enclosures is openable and closable in two directions including the vertical direction and the horizontal direction. Even when the portable radio device is opened in the horizontal direction or the vertical direction, high antenna performance can be realized without use of an external antenna.

BRIEF DESCRIPTION OF THE DRAWINGS

FIG. 10 is a schematic view showing a lock mechanism doubling also as a connection section of the portable radio device according to the fourth embodiment of the present invention.

Figure 1:
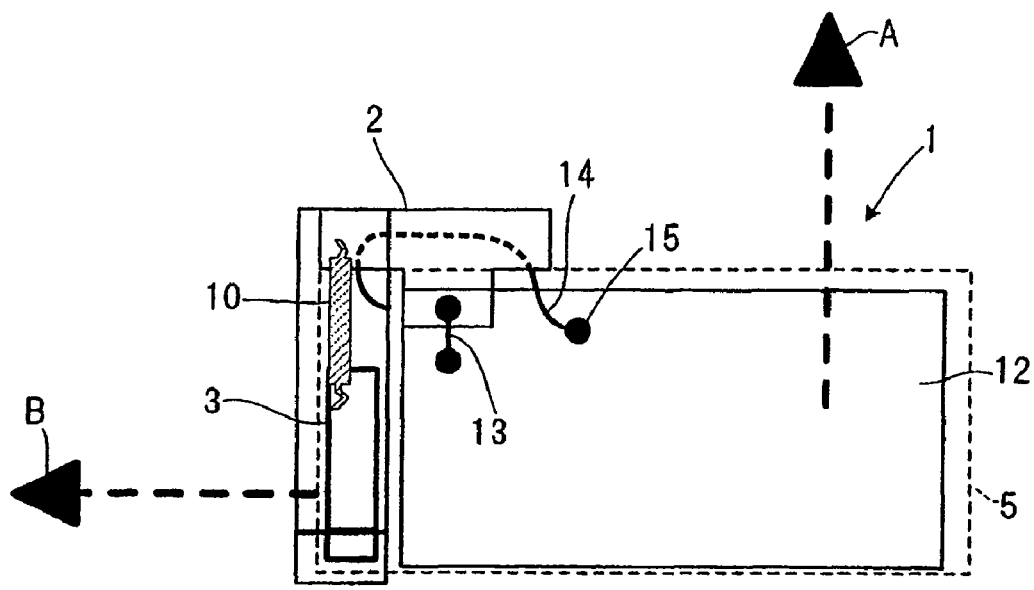
FIG. 1 is a schematic view showing a folded state of a portable radio device according to a first embodiment of the present invention.

DESCRIPTIONS OF THE REFERENCE NUMERALS AND SYMBOLS 1, 20, 30 PORTABLE RADIO DEVICE
2, 3 HINGE SECTION 2a, 3a STATIONARY SECTION
2b, 3b ROTARY SECTION
2c MOUNT SECTION
4 LOWER ENCLOSURE
5 UPPER ENCLOSURE
6, 12 CIRCUIT BROAD
7 RADIO CIRCUIT
8, 8A, 8B MATCHING CIRCUIT
9 FEEDING SECTION
10, 11 ANTENNA ELEMENT
13, 41 CONNECTION MEMBER
14 CABLE
15, 43 CONNECTION SECTION
21 REACTANCE ELEMENT
31 SWITCHING CIRCUIT
42 LOCK MECHANISM

Best Modes for Implementing the Invention

Preferred embodiments for implementing the present invention are hereinbelow described in detail by reference to the drawings.

First Embodiment

Figure 2:
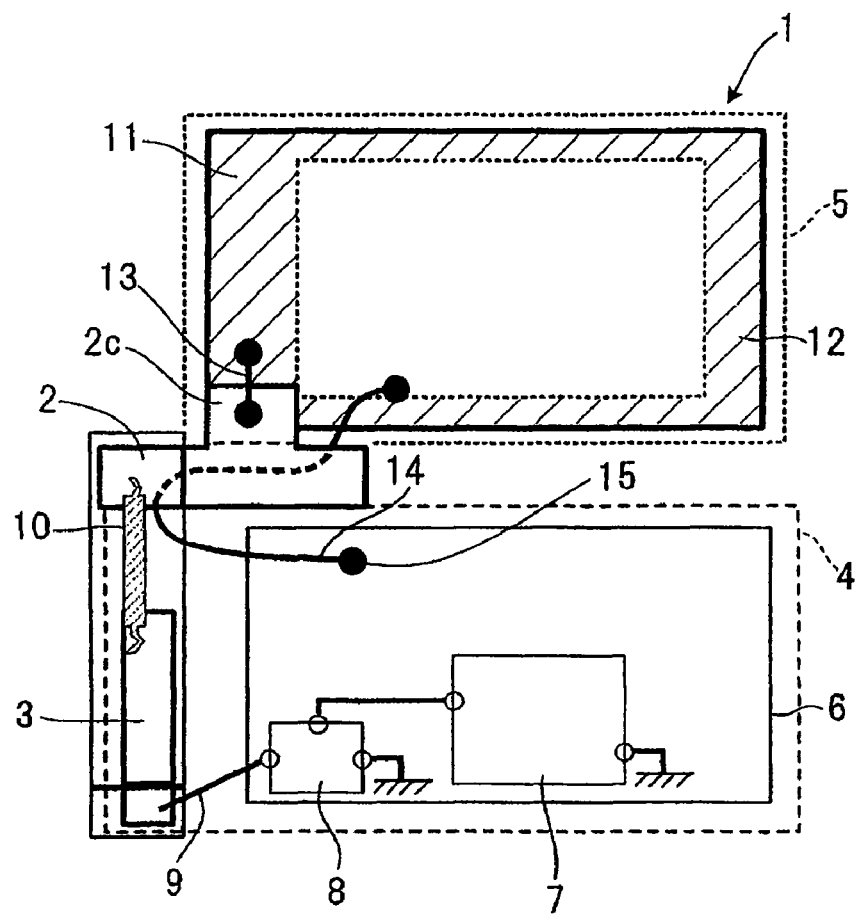
FIG. 2 is a schematic view showing that the portable radio device shown in FIG. 1 is horizontally opened.
Figure 3:
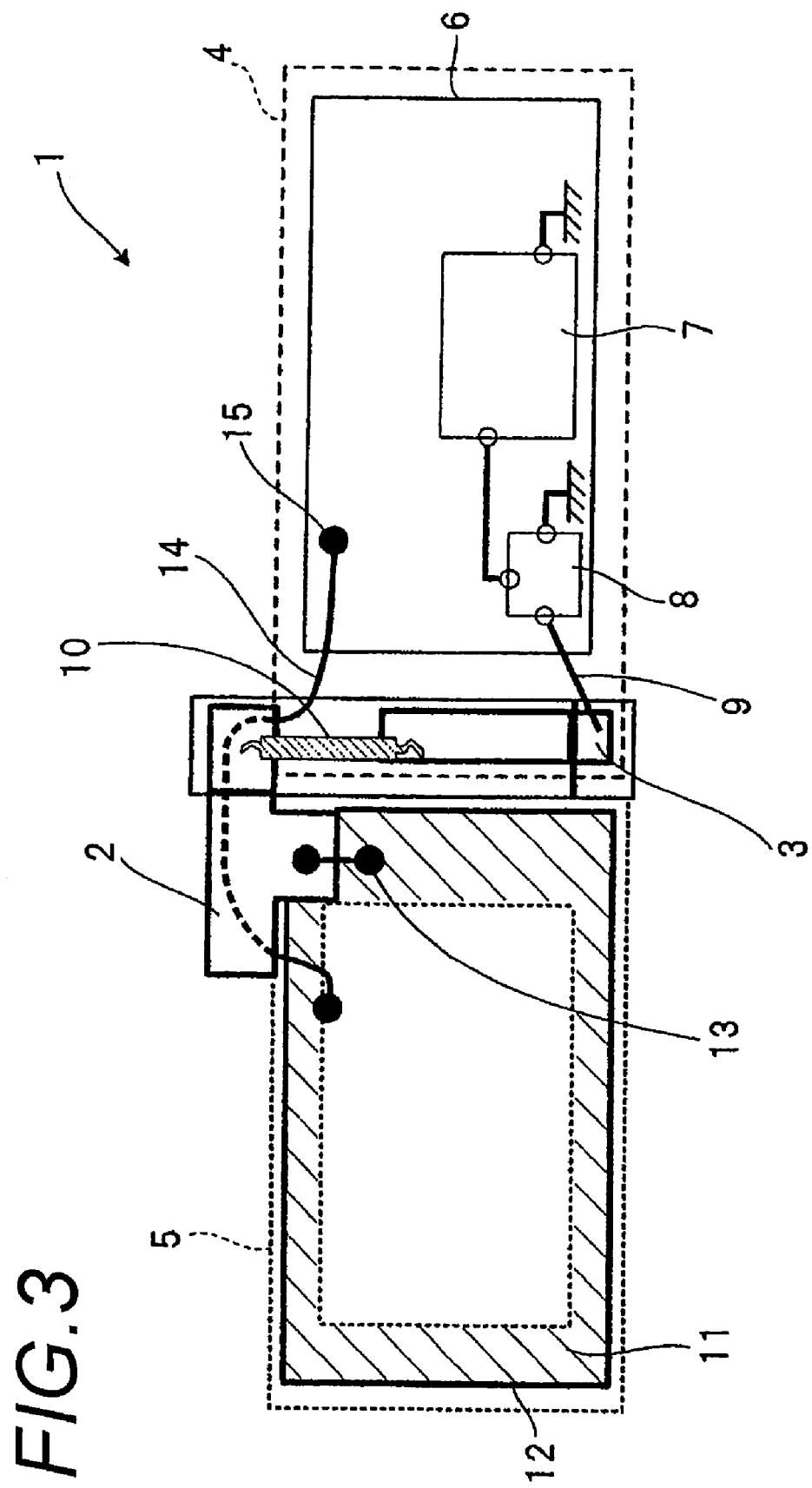
FIG. 3 is a schematic view showing that the portable radio device shown in FIG. 1 is vertically opened.

FIG. 1 is a schematic view showing a folded state of a portable radio device according to a first embodiment of the present invention. In the drawing, a portable radio device 1 of the present embodiment has two enclosures including an upper enclosure and a lower enclosure. By means of two hinge sections 2 and 3 formed from a conductive member, the two enclosures are openable and closable in two directions including a horizontal direction (a lateral direction) and a vertical direction (a longitudinal direction). FIG. 2 is a schematic view showing that the portable radio device 1 of the embodiment is horizontally opened (in direction of arrow A shown in FIG. 1). FIG. 3 is a schematic view showing that the portable radio device 1 of the embodiment is vertically opened (in direction of arrow B shown in FIG. 1). When horizontally opened from its folded state shown in FIG. 1, the portable radio device 1 takes such a form as shown in FIG. 2. Further, when vertically opened, the portable radio device takes such a form as shown in FIG. 3. In this case, the hinge section 2 is for horizontally opening the portable radio device 1, and the hinge section 3 is for vertically opening the portable radio device 1.

Figure 4:
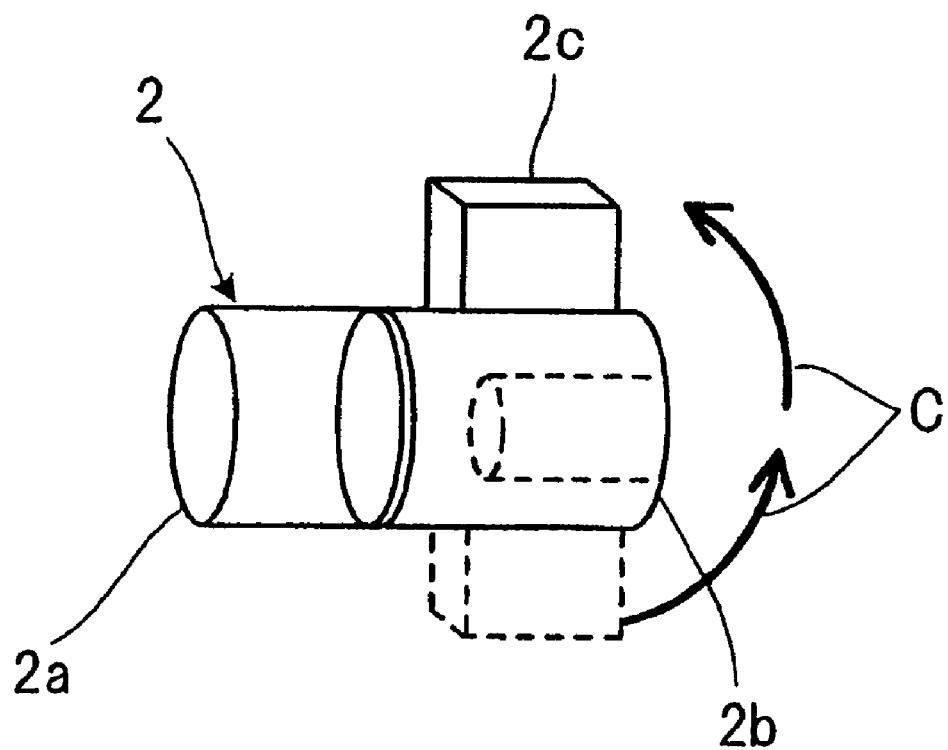
FIG. 4 shows a hinge section for horizontally opening a lower enclosure and an upper enclosure of the portable radio device shown in FIG. 1.
Figure 5:
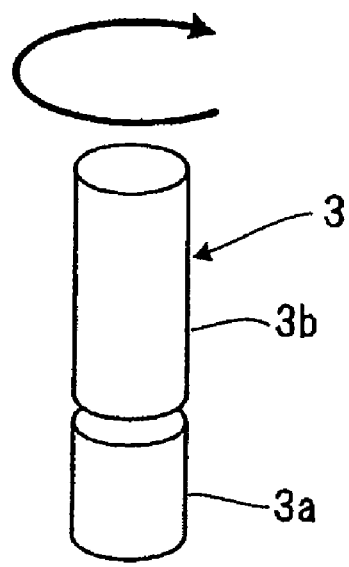
FIG. 5 shows the hinge section for vertically opening the lower enclosure and the upper enclosure of the portable radio device shown in FIG. 1.

As shown in FIG. 4, the hinge section 2 used for horizontally opening the portable radio device 1 includes a stationary section 2a that is formed into a substantially cylindrical shape and that is fixed to a lower enclosure 4 (a first enclosure and see FIG. 2 or 3); a rotary section 2b rotatable with respect to the stationary section 2a; and a quadrature mount section 2c having a predetermined thickness for fastening the rotary section 2b to an upper enclosure 5 (a second enclosure and see FIG. 2 or 3). FIG. 4 shows that the rotary section 2b is rotated through 90° in direction of an arrow C. As a result of the rotary section 2b being additionally rotated through 90° in the same direction, whereupon the mount section 2c located at a position indicated by a dotted line comes to a position indicated by a solid line. In the meantime, as shown in FIG. 5, the hinge section 3 for vertically opening the portable radio device 1 is formed into a substantially-cylindrical shape. The hinge section 3 includes a stationary section 3a secured to the lower enclosure 4 and a rotary section 3b that is rotatable with respect to the stationary section 3a and that is fixed to the upper enclosure 5. The lower enclosure 4 and the upper enclosure 5 are joined so as to be rotatable in a horizontal direction by means of the hinge section 2, and the lower enclosure 4 and the upper enclosure 5 are joined so as to be rotatable in a vertical direction by the hinge section 3. Accordingly, the portable radio device 1 can freely open and close in two directions including the vertical direction and the horizontal direction.

In FIG. 2 or 3, the lower enclosure 4 is equipped with a circuit board 6, and a radio circuit 7 and a matching circuit 8 are implemented on the circuit board 6. The upper enclosure 5 is also equipped with a circuit board 12. When the portable radio device 1 of the present embodiment is used as a portable phone, the radio circuit 7 implemented on the circuit board 6 transmits and receives a radio signal by means of a frequency and a modulation scheme used by a portable phone. The matching circuit 8 implemented on the circuit board 6 is for establishing impedance matching between an antenna element (the first antenna element) 10 and the radio circuit 7. A feeding section 9 for feeding power from the circuit board 6 to one end of the antenna element 10 is interposed between the circuit board 6 and the hinge section 3.

One end of the antenna element 10 is connected to the hinge section 3, and the other end of the same is connected to the hinge section 2. The mount section 2c of the hinge section 2 is electrically connected to an antenna element (a second antenna element) 11 of the upper enclosure 5 by a connection member 13. In the embodiment, the antenna element 11 is a metal frame configuring a part of the upper enclosure 5. There is formed a dipole antenna including the antenna elements 10 and 11 and the hinge sections 2 and 3 as upper-side elements and a ground pattern of the circuit board 6 of the lower enclosure 4 as a lower-side element. As a result of the entire enclosures being utilized as an antenna, the volume of the portable radio device 1 can be utilized to the greatest extent, and high antenna performance can be fulfilled without use of an external antenna. Cost can also be curtailed when compared with a case where the radio portable device is provided with the external antenna. The antenna element 11 serving as the second antenna element can also be an antenna element utilizing a ground pattern of the circuit board 12 in the upper enclosure 5. Cost can be curtailed even in this case.

The circuit board 6 of the lower enclosure 4 and the circuit board 12 of the upper enclosure 5 are electrically connected to each other by way of a cable (cable section) 14. The cable 14 is used for transmitting a signal between the circuit board 6 and the circuit board 12 and usually includes a plurality of signal lines. A connection section 15 on the circuit board 6 that is connected to the cable 14. The circuit board 6 is spaced apart from the feeding section 9 by a predetermined distance (1/20 of a wavelength corresponding to an operating frequency) or more. Specifically, a distance over which the feeding section 9 and the connection section 15 are separated from each other is set to 1/20 or more of the wavelength corresponding to the operating frequency. As a result of the feeding section 9 and the connection section 15 being separated from each other by the distance of 1/20 or more of the wavelength corresponding to the operating frequency, it is possible to well feed power to the antenna elements 10 and 11, and high radiation resistance can be assured. Therefore, high antenna performance can be implemented. For instance, when a one-segment broadcast is received, the distance between the feeding section 9 and the connection section 15 is set to a value of 40 mm or more.

As mentioned above, the portable radio device 1 of the embodiment adopts an enclosure dipole antenna structure including the antenna elements 10 and 11 provided in the lower enclosure 4 and the upper enclosure 5. The portable radio device 1 also adopts the structure in which the lower enclosure 4 and the upper enclosure 5 are rotatably joined together along two axes of the hinges 2 and 3. Thus, the portable radio device 1 can open and close in the two directions including the vertical direction and the horizontal direction and exhibit high antenna performance regardless of whether it opens in the vertical direction or the horizontal direction. Further, the feeding section 9 and the connection section 15 are separated from each other by a distance equivalent to 1/20 or more of the wavelength corresponding to the operating frequency. Hence, power can well be fed to the antenna elements 10 and 11, and high radiation resistance can be assured. Therefore, high antenna performance can be fulfilled.

In the embodiment, the lower enclosure 4 and the upper enclosure 5 are arranged so as to open in both the horizontal direction and the vertical direction by means of the two hinge sections 2 and 3. However, the lower enclosure 4 and the upper enclosure 5 can also be arranged so as to open in both the horizontal and vertical directions by means of one hinge section into which the hinge sections 2 and 3 are integrated. The hinge section can be formed from; for instance, a first hinge section that rotatably joins the lower enclosure 4 to the upper enclosure 5 along one of the axes of the enclosures and a second hinge section that rotatably joins the lower enclosure 4 and the upper enclosure 5 along the other axis perpendicular to the one axis.

Second Embodiment

Figure 6:
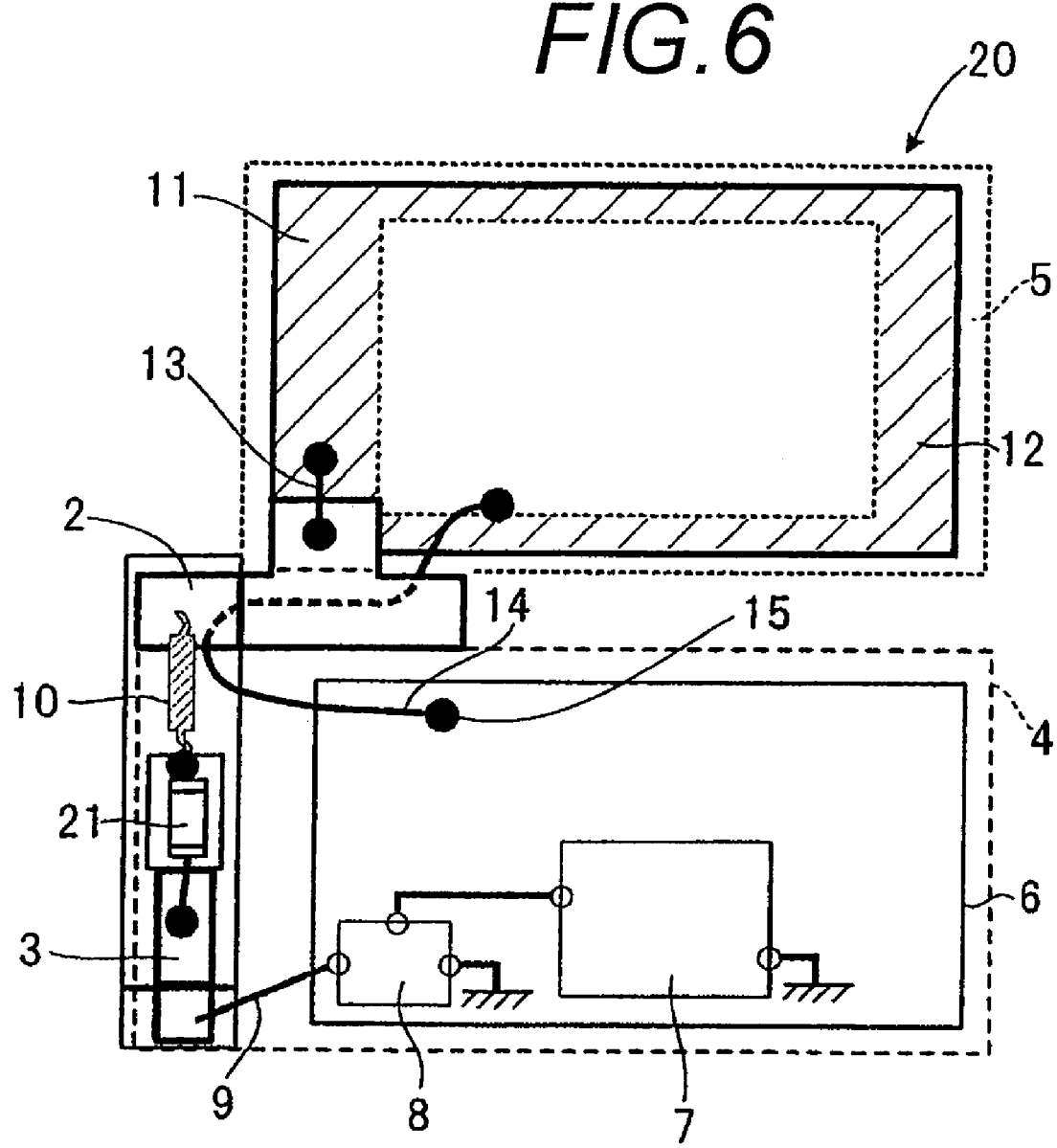
FIG. 6 is a schematic view showing a horizontally-opened portable radio device according to a second embodiment of the present invention.

FIG. 6 is a schematic view showing a horizontally-opened portable radio device according to a second embodiment of the present invention. In FIG. 6, elements that are common to their foregoing counterparts shown in FIG. 2 are assigned the same reference numerals. A portable radio device 20 of the embodiment includes a reactance element (L: a coil, C: a capacitor, and the like) 21 serially connected to the antenna element 10 interposed between the hinge section 2 and the hinge section 3. The reactance element 21 serially connected to the antenna element 10, thereby making it possible to optimize a relationship between the phase of an electric current to the antenna elements 10 and 11 and the phase of the electric current to the circuit board 6 and realize much greater antenna performance.

Third Embodiment

Figure 7:
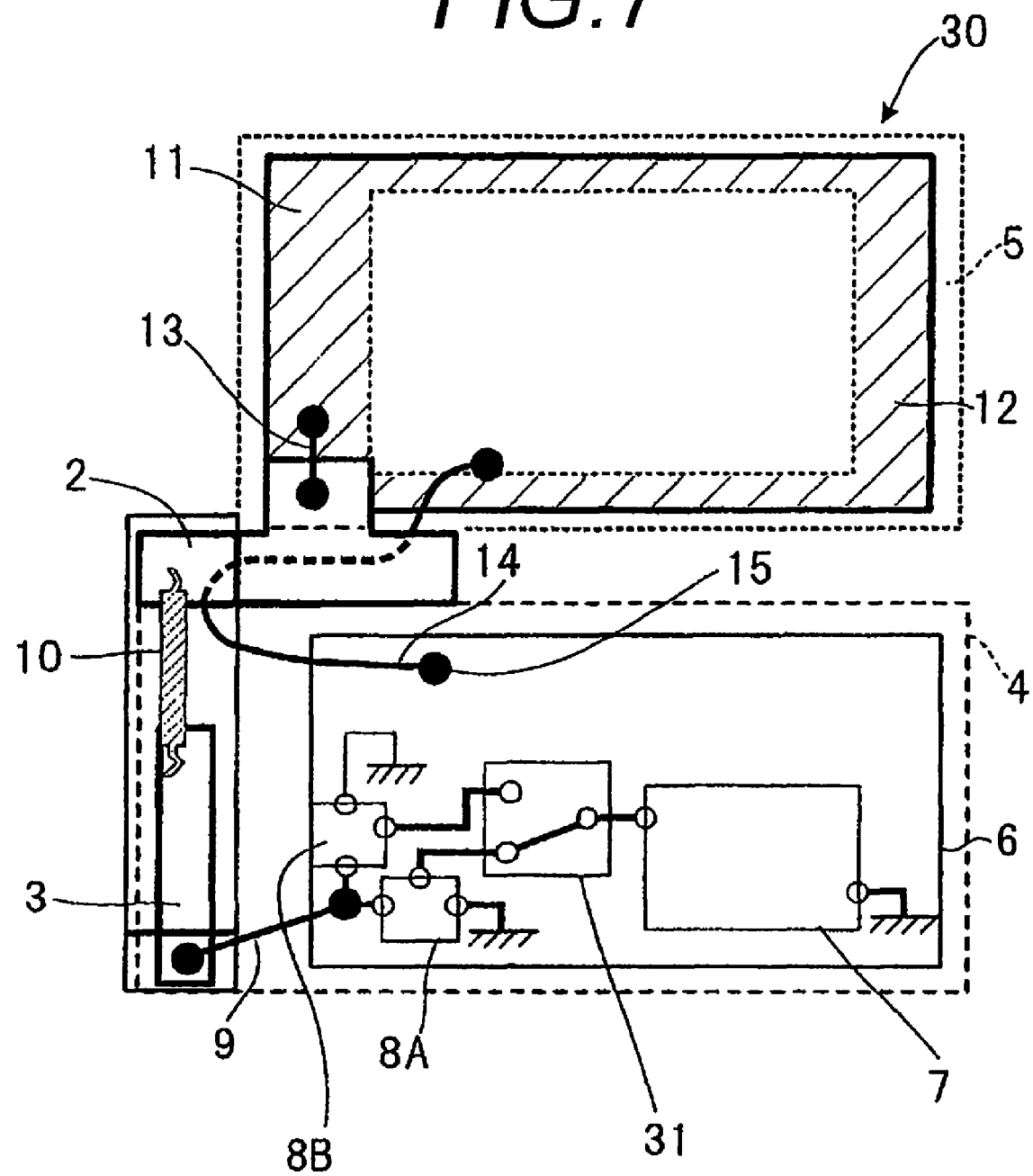
FIG. 7 is a schematic view showing a horizontally-opened portable radio device according to a third embodiment of the present invention.

FIG. 7 is a schematic view showing a horizontally-opened portable radio device according to a third embodiment of the present invention. In FIG. 7, elements that are common to their foregoing counterparts shown in FIG. 2 are assigned the same reference numerals. A portable radio device 30 of the embodiment includes two matching circuits 8A and 8B and a switching circuit 31 provided between the radio circuit 7 and the feeding section 9. The switching circuit 31 switches between the matching circuit 8A and the matching circuit 8B according to the rotating direction of the upper enclosure 5 with respect to the lower enclosure 4. Namely, when the lower enclosure 4 and the upper enclosure 5 are horizontally opened, the switching circuit 31 performs switching to select the matching circuit 8A. When the lower enclosure 4 and the upper enclosure 5 are vertically opened, the switching circuit 31 performs switching to select the matching circuit 8B. A conceivable specific method for detecting a direction in which the lower enclosure 4 and the upper enclosure 5 are opened is to use detection means including; for instance, a magnet and a Hall element.

As mentioned above, switching between the matching circuit 8A and the matching circuit 8B is performed according to the direction in which the lower enclosure 4 and the upper enclosure 5 are opened. Accordingly, even when a change arises in impedance as a result of the geometry of the antenna being changed according to the direction in which the lower enclosure 4 and the upper enclosure 5 are opened, the impedance can be optimized, and much higher antenna performance can be realized.

The foregoing first through third embodiments are directed toward the portable radio device having a structure of enabling opening and closing actions in two directions including the vertical direction and the horizontal direction. However, a similar advantage can be yielded even when portable radio device has a structure of enabling opening and closing actions in only a horizontal direction.

Fourth Embodiment

Figure 8:
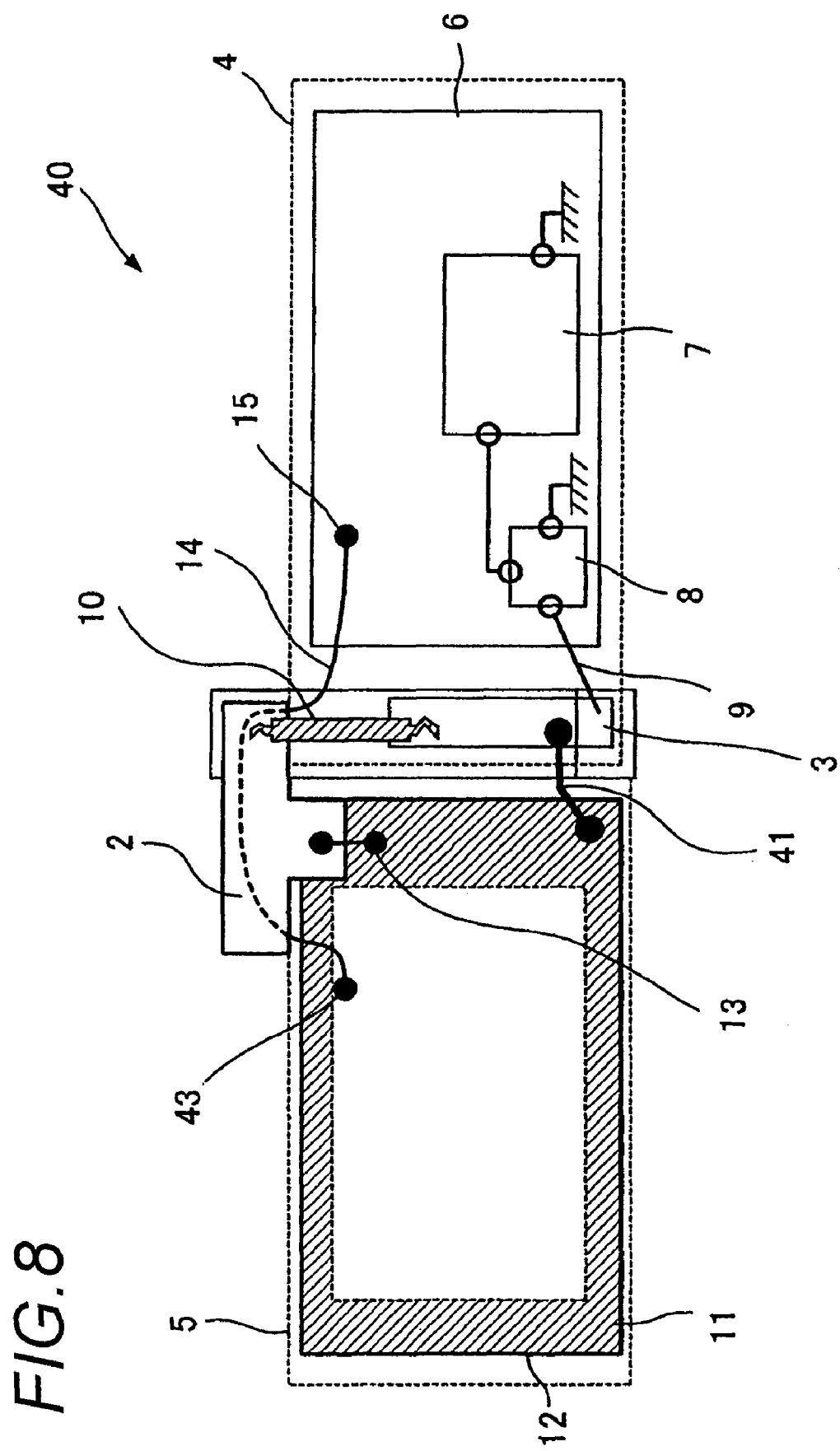
FIG. 8 is a schematic view showing a vertically-opened portable radio device according to a fourth embodiment of the present invention.
Figure 9:
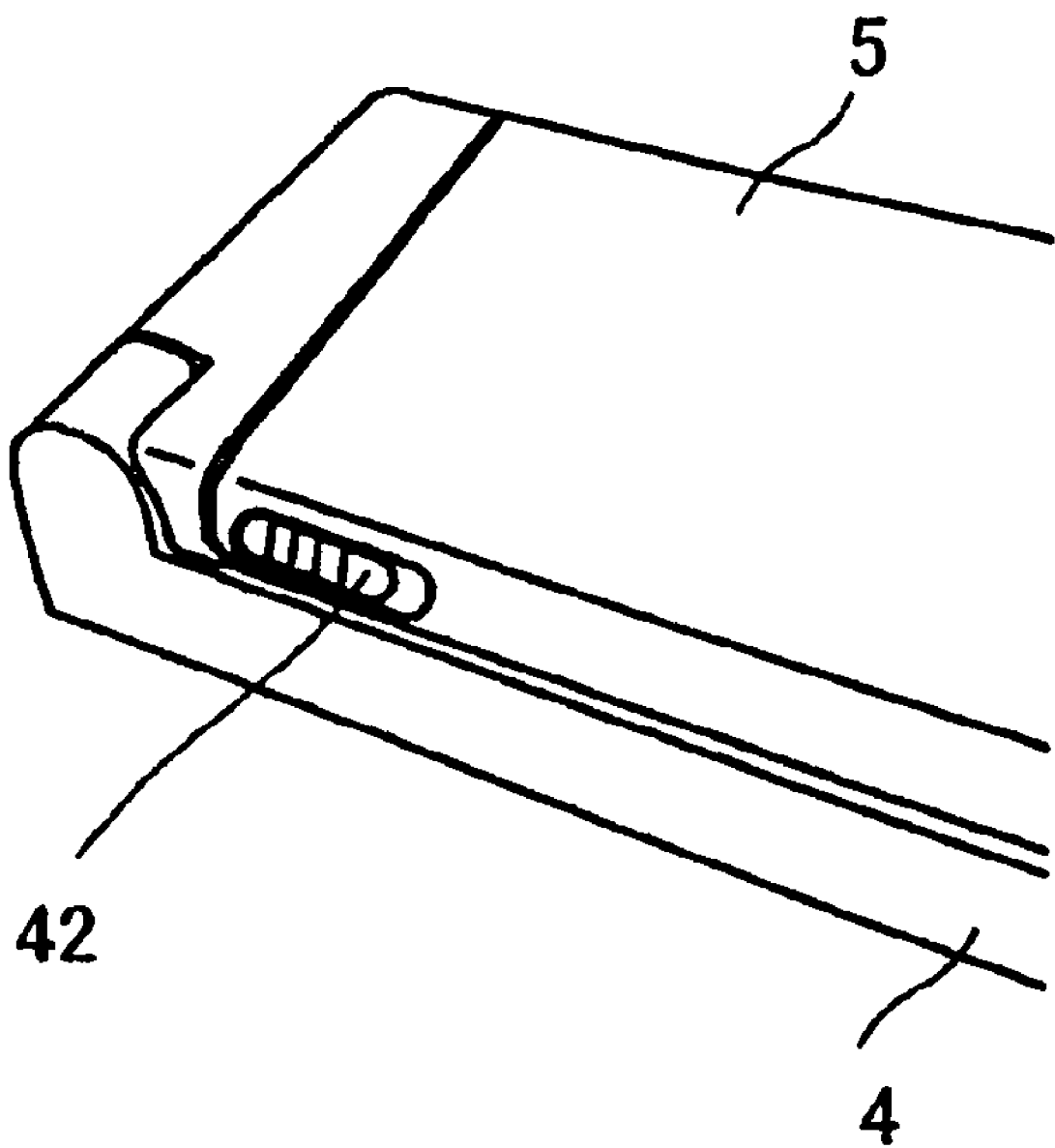
FIG. 9 is an overview of a portable radio device according to the fourth embodiment of the present invention.

FIG. 8 is a schematic view showing a portable radio device according to a fourth embodiment of the present invention opened in the vertical direction (in the longitudinal direction). In FIG. 8, elements that are common to their foregoing counterparts shown in FIG. 3 are assigned the same reference numerals. In a portable radio device 40 of the embodiment, when the lower enclosure 4 and the upper enclosure 5 are vertically opened, a connection member 41 electrically connects the hinge section 3 to the second antenna element 11. A conceivable specific method for electrically connecting the hinge section 3 to the second antenna element 11 when the lower enclosure 4 and the upper enclosure 5 are vertically opened is to use, also as the connection member 41, a lock mechanism 42 that is to be unlocked for opening the lower enclosure 4 and the upper enclosure 5 in the horizontal direction (the lateral direction), as shown in the schematic view shown in FIG. 9. FIG. 10 is a schematic view showing the lock mechanism 42 doubling as the connection member 41. When the portable radio device is vertically opened, the hinge section 3 and the second antenna element 11 are electrically connected as shown in (a) of FIG. 10. In order to horizontally open the portable radio device, the lock mechanism 42 doubling also as the connection member 41 must be slid so as to be unlocked, whereby the hinge section 3 and the second antenna element 11 are electrically disconnected from each other when the enclosures are horizontally opened. A location where the connection member 41 is connected to the second antenna element 11 is at a position spaced apart, by a predetermined distance (1/20 of the wavelength corresponding to the operating frequency) or more, from a connection section 43 on the circuit board 12 where the circuit board 12 provided in the upper enclosure 5 is connected to the cable 14.

As mentioned above, when the lower enclosure 4 and the upper enclosure 5 are vertically opened, the hinge section 3 and the second antenna element 11 are electrically connected together at a position spaced apart from the connection section 43 by a distance of 1/20 or more of the wavelength corresponding to the operating frequency. A current component achieved at the hinge section 3 and the first antenna element 10 and a current component achieved at an end close to the hinge section 3 of the second antenna element 11, which are out of phase with each other, can be lessened, and high radiation resistance can be assured. Therefore, when the portable radio device is vertically opened, much greater antenna performance can be implemented.

In the embodiment, the hinge section 3 and the second antenna element 11 are electrically connected to each other. Alternatively, the first antenna element 10 and the second antenna element 11 can be electrically connected together. The connection member 41 is used also as the lock mechanism 42, whereby the thickness and cost of portable radio device can be reduced.

The present invention has been explained in detail with reference to the particular embodiments. However, it is obvious for those skilled in the art that various variations and modifications can be applied without departing from the spirit and the scope of the present invention.

This application is based upon and claims the benefit of priorities of Japanese Patent Application No. 2007-283437 filed on Oct. 31, 2007 and Japanese Patent Application No. 2008-151977 filed on Jun. 10, 2008, the contents of which are incorporated herein by reference in its entirety.

Industrial Applicability

The present invention yields an advantage of the ability to open and close the lower enclosure and the upper enclosure in two directions including the vertical direction and the horizontal direction, and an advantage of the ability to exhibit high antenna performance without use of an external antenna regardless of whether the device is opened in the vertical direction or the horizontal direction. The present invention is applicable to a portable radio device having a structure for enabling folding of enclosures, such as a portable phone and a PHS.

The invention claimed is:

1. A portable radio device comprising:
    a first enclosure;
    a second enclosure;
    a first hinge section rotatably joining the first enclosure to the second enclosure along one axis;
    a second hinge section rotatably joining the first enclosure to the second enclosure along another axis orthogonal to the one axis;
    a first antenna element;
    a second antenna element in the second enclosure;
    a first circuit board in the first enclosure;
    a second circuit board in the second enclosure;
    a feeding section for feeding power from the first circuit board to the first hinge section;
    a cable section electrically connecting the first circuit board and the second circuit board for exchanging signal between the first circuit board and the second circuit board; and
    a connection section connecting the first circuit board to the cable section, wherein
    each of the first hinge section and the second hinge section are formed from a conductive member;
    the feeding section and the first hinge section are electrically connected together;
    the second antenna element and the second hinge section are electrically connected together;
    the first hinge section and the second hinge section are electrically connected together by way of the first antenna element; and
    the feeding section and the connection section are separated from each other by a distance of $1/20$ or more of a wavelength corresponding to an operating frequency.

2. The portable radio device according to claim 1, further comprising:
    a switching unit adapted to electrically switch the first hinge section or the first antenna element and the second antenna element between an electrically connected state and an electrically disconnected state, wherein
    the switching unit electrically connects the first hinge section or the first antenna element to the second antenna element when the second enclosure is opened in a longitudinal direction with respect to the first enclosure; and
    the switching unit is separated from the connection section by the distance of $1/20$ or more of the wavelength corresponding to the operating frequency.

3. The portable radio device according to claim 2, further comprising:
    a lock mechanism adapted to lock the second enclosure to open in a lateral direction with respect to the first enclosure; and
    the switching unit is the lock mechanism.

4. The portable radio device according to claim 1, further comprising a reactance element connected in series to the first antenna element.

5. The portable radio device according to claim 1, further comprising:
    a first matching circuit and a second matching circuit, each connected to the feeding section;
    a detection unit adapted to detect a direction in which the second enclosure rotates with respect to the first enclosure; and
    a switching circuit for switching between the first matching circuit and the second matching circuit according to a result of detection of the detection unit.

6. The portable radio device according to claim 1, wherein the second antenna element is a metal frame configuring a part of the second enclosure.

7. The portable radio device according to claim 1, wherein the second antenna element is a ground pattern of the first circuit board provided in the second enclosure.

* * * * *